US009924828B2

(12) United States Patent
Grassia (10) Patent No.: US 9,924,828 B2
(45) Date of Patent: Mar. 27, 2018

(54) ESPRESSO MACHINE WITH AMERICANO FEATURE

(71) Applicant: BREVILLE PTY LIMITED, Alexandria, New South Wales (AU)

(72) Inventor: Robert Grassia, Summer Hill (AU)

(73) Assignee: BREVILLE PTY LIMITED, Alexandria, New South Wales (AU)

( * ) Notice: Subject to any disclaimer, the term of this patent is extended or adjusted under 35 U.S.C. 154(b) by 219 days.

(21) Appl. No.: 14/422,684

(22) PCT Filed: Aug. 30, 2013

(86) PCT No.: PCT/AU2013/000975
§ 371 (c)(1),
(2) Date: Feb. 19, 2015

(87) PCT Pub. No.: WO2014/032110
PCT Pub. Date: Mar. 6, 2014

(65) Prior Publication Data
US 2015/0208851 A1    Jul. 30, 2015

(30) Foreign Application Priority Data
Aug. 30, 2012 (AU) ................ 2012903748

(51) Int. Cl.
*A47J 31/30* (2006.01)
*A47J 31/06* (2006.01)
(Continued)

(52) U.S. Cl.
CPC ............ *A47J 31/30* (2013.01); *A47J 31/002* (2013.01); *A47J 31/0652* (2013.01);
(Continued)

(58) Field of Classification Search
CPC ...... A47J 31/30; A47J 31/002; A47J 31/0657; A47J 31/46; A47J 31/0652; A47J 31/3671
See application file for complete search history.

(56) References Cited

U.S. PATENT DOCUMENTS 2,451,195 A * 10/1948 Brown ................ A47J 31/0663
99/295
3,824,914 A * 7/1974 Casiano ................ A47J 31/402
99/302 R
(Continued)

FOREIGN PATENT DOCUMENTS

CN           1921787 A      2/2007
CN         101170934 A      4/2008
(Continued)

OTHER PUBLICATIONS

International Search Report and Written Opinion for PCT/AU2013/000975, dated Nov. 4, 2013.
(Continued)

*Primary Examiner* — Sean Michalski
(74) *Attorney, Agent, or Firm* — Marshall, Gerstein & Borun LLP (57) ABSTRACT

An espresso machine is constructed and programmed to have secondary water system. The secondary water supply works in conjunction with the coffee brewing mechanisms of the device to produce and Americano style coffee beverage. The size and strength of the resulting beverage may be pre-set, or user programmable.

6 Claims, 11 Drawing Sheets

(51) Int. Cl.
*A47J 31/36* (2006.01)
*A47J 31/46* (2006.01)
*A47J 31/00* (2006.01)

(52) U.S. Cl.
CPC ....... *A47J 31/0657* (2013.01); *A47J 31/3671* (2013.01); *A47J 31/46* (2013.01)

(56) References Cited

U.S. PATENT DOCUMENTS

| | | | | |
|---|---|---|---|---|
| 4,055,279 | A * | 10/1977 | Lapera | B60N 3/18 137/354 |
| 4,200,039 | A * | 4/1980 | Anderl | A47J 31/30 99/281 |
| 4,287,817 | A * | 9/1981 | Moskowitz | A47J 31/54 392/403 |
| 4,565,121 | A * | 1/1986 | Ohya | A47J 31/56 392/445 |
| 4,644,856 | A * | 2/1987 | Borgmann | A47J 31/0663 210/455 |
| 4,757,753 | A * | 7/1988 | Pandolfi | A47J 31/36 99/290 |
| 5,127,318 | A * | 7/1992 | Selby, III | A23F 5/26 99/295 |
| 5,598,764 | A * | 2/1997 | Bambi | A47J 31/002 99/295 |
| 5,642,656 | A * | 7/1997 | Braendle | A47J 31/0663 99/295 |
| 5,778,765 | A * | 7/1998 | Klawuhn | A47J 31/46 99/290 |
| 5,813,318 | A * | 9/1998 | Zanin | A47J 31/007 99/291 |
| 5,931,080 | A * | 8/1999 | Roure Boada | A47J 31/4482 261/DIG. 76 |
| 6,067,895 | A * | 5/2000 | Buist | A47J 31/4407 99/283 |
| 6,701,826 | B2 * | 3/2004 | Wu | A47J 31/002 99/300 |
| D497,510 | S * | 10/2004 | Comorera Ivanov | A47J 31/002 D7/307 |
| D515,862 | S * | 2/2006 | Pighetti | A47J 31/007 D7/309 |
| 7,162,949 | B1 * | 1/2007 | Hart | A47J 31/007 222/146.5 |
| 7,219,597 | B2 * | 5/2007 | Eicher | A47J 31/46 99/290 |
| 7,335,387 | B2 * | 2/2008 | Hayes | A47J 31/002 426/112 |
| 7,743,695 | B2 * | 6/2010 | Oehninger | A47J 31/3609 99/280 |
| 9,402,499 | B2 * | 8/2016 | Bambi | A47J 31/0663 |
| 9,560,930 | B2 * | 2/2017 | Fin | A47J 31/3633 |
| 9,629,497 | B2 * | 4/2017 | Ciaramelli | A47J 31/46 |
| 9,648,981 | B2 * | 5/2017 | Baldo | A47J 31/4482 |
| 9,655,470 | B2 * | 5/2017 | Ruhl | A47J 31/46 |
| 2004/0000237 | A1 | 1/2004 | Wu | |
| 2010/0018407 | A1 | 1/2010 | Liu | |
| 2010/0251899 | A1 | 10/2010 | Lin | |
| 2011/0252976 | A1 | 10/2011 | Liu | |

FOREIGN PATENT DOCUMENTS

| | | |
|---|---|---|
| CN | 100496357 C | 6/2009 |
| CN | 102217900 A | 10/2011 |

OTHER PUBLICATIONS

International Preliminary Report on Patentability for PCT/AU2013/000975, dated Mar. 3, 2015.
Office Action for Chinese Patent Application No. 2013800561902.
Extended European Search Report for European Patent Application No. 13832731.7, dated May 20, 2016.
First Examination Report for Australian Patent Application No. 2013308405, dated Sep. 21, 2016.
Second Report for Australian Patent Application No. 2013308405, dated Jan. 11, 2017.
Third Report for Australian Patent Application No. 2013308405, dated Mar. 16, 2017.

* cited by examiner

ESPRESSO MACHINE WITH AMERICANO FEATURE

FIELD OF THE INVENTION

The invention relates to espresso machines and more particularly to an espresso machine with a cafe Americano feature.

BACKGROUND OF THE INVENTION

A typical cafe Americano or "long black" consists of a standard dose of extracted espresso coffee (about 30 mls) in a total beverage volume of about 200 mls, the balance between the espresso and the total volume being hot water. Other ratios and volumes are also contemplated.

One popular but inferior way of making a cafe Americano or long black is to load a portafilter of a espresso machine with a standard single dose of ground coffee, extracting the full volume of the cafe Americano through the portafilter and with the portafilter in place. Although this method is easy, the passage of more than about 25-30 mls of water through the grounds in the portafilter results in over-extracting and drawing out of woody, pungent and other unintended flavours. This diminishes the quality and taste of the beverage. The correct ordinary method for making a cafe Americano or long black is a two (2) step process. In the first step, a standard dose of espresso coffee is extracted into a cup then moved to an auxiliary or secondary outlet for the addition of the final volume of hot water. This process can be reversed so that the water is added first followed by the standard espresso shot, dose or serving.

The above correct, two (2) step process however requires, with respect to either variation, the additional step of relocating the drinking vessel and adding water at a location that is usually not directly under the portafilter of the espresso machine.

OBJECT AND SUMMARY OF THE INVENTION

It is an object of the invention to provide an espresso machine that is adapted to make a cafe Americano or long black in a single step.

It is another object of the invention to provide an espresso machine that is adapted to make a true cafe Americano in a single process step without resort to having to move the cup after the coffee is brewed or before the cup is placed under the portafilter.

BRIEF DESCRIPTION OF THE DRAWING FIGURES

A preferred embodiment of the invention will now be described, by way of example only, with reference to the accompanying drawings in which.

BEST MODE AND OTHER EMBODIMENTS

Figure 1:
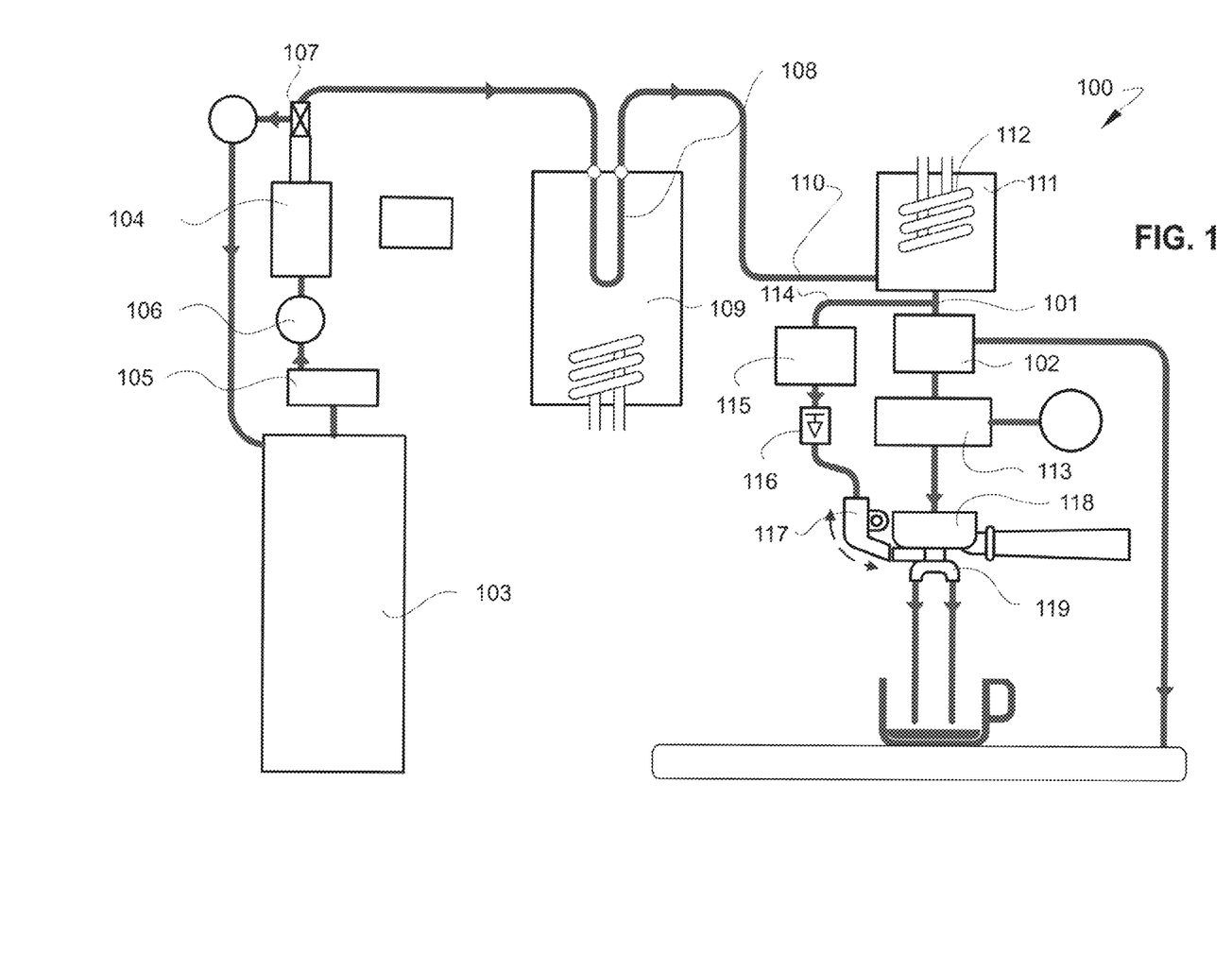
FIG. 1 is a schematic diagram illustrating the operation of an espresso machine with a cafe Americano feature.

As shown in FIG. 1, an espresso machine 100 comprises, in this example, a hot water delivery system that ultimately provides a supply of hot water 101 to a solenoid controlled valve 102. In this example, the hot water delivery system comprises a water reservoir 102 and a pump, for example a 15 bar pump 104 that draws water from the reservoir 103 through an optional filter 105 and flow meter 106. The hot water delivery system may incorporate a safety relief valve 107 in the flow path of the pump 104. Water that is not ejected from the safety relief valve 107 may optionally pass through a pre-heating heat exchanger 108 that is, in this example, contained within the device's steam boiler 109. Pre-heated water 110 is delivered to a coffee boiler in having a heating element 112. The hot water discharge of the boiler 111 is introduced into the solenoid valve or other device for controlling flow 102. In this example, the solenoid is a 3-way 2 position solenoid. The solenoid 102 either dispenses hot water to the group head 113 of the espresso machine 100 or closes off the flow path to the group head and vents the downstream flow path to the atmosphere a drip tray.

In order to provide a cafe Americano or long black coffee, the hot water discharge 101 from the boiler 111 is split to provide a second or auxiliary hot water (only) delivery flow path 114 that leads to a second control valve such as the electronic solenoid controlled valve 115. The second or auxiliary hot water flow path adds hot water to the brewed coffee without passing through any coffee grinds. The second solenoid valve is preferably a 2-way 2 position valve that is either opened or closed with respect to the downstream flow. To prevent dripping after use, the hot water flow from the second solenoid valve 115 passes through a one-way or check valve 116 that closes when the water pressure is relieved. The flow from the second solenoid valve 115 then passes through a hot water spout 117 that is adapted to discharge into the body of a portafilter assembly 118 that is located in the group head 113. Hot water entering the portafilter 118 from the spout 117 (below the grounds in the portafilter but above the spout 119) is discharged through the discharge spout of the portafilter assembly 119. The microprocessor controller that controls the operation of the espresso machine 100 allows the device to dispense hot water from the spout 117 either before or after the conventional dose of coffee is delivered from the portafilter's discharge spout 119. In some embodiments, the hot water component of the cafe Americano is discharged from the hot water spout 117 after all of the brewed coffee has been discharge from the portafilter. By using conventional dispensing and metering techniques, the volume of the hot water discharged from the hot water spout 117 can be adjusted by the user from a user interface that cooperates with the devices microprocessor controller. For a typical cafe Americano, the volume of the espresso shot is about 30 mls and the volume of the hot water dispensed into the cup afterwards is about 170 mls.

Figure 2:
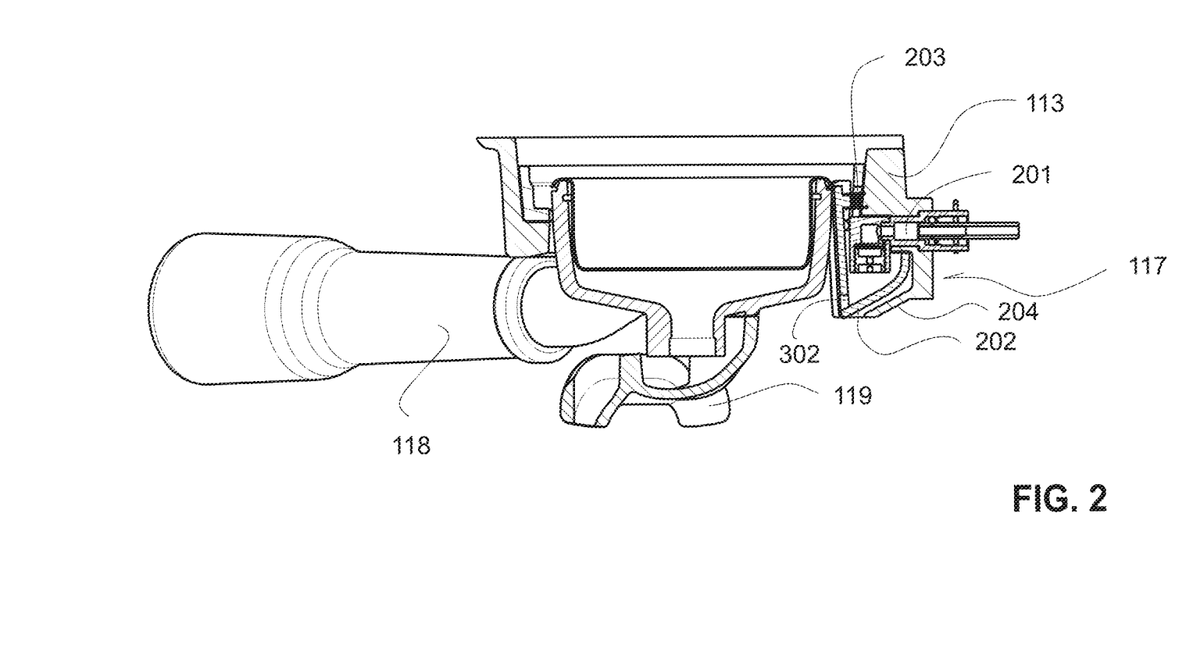
FIG. 2 is a side elevation of a portafilter, group head and pivoting spout, partially cross sectioned.
Figure 3:
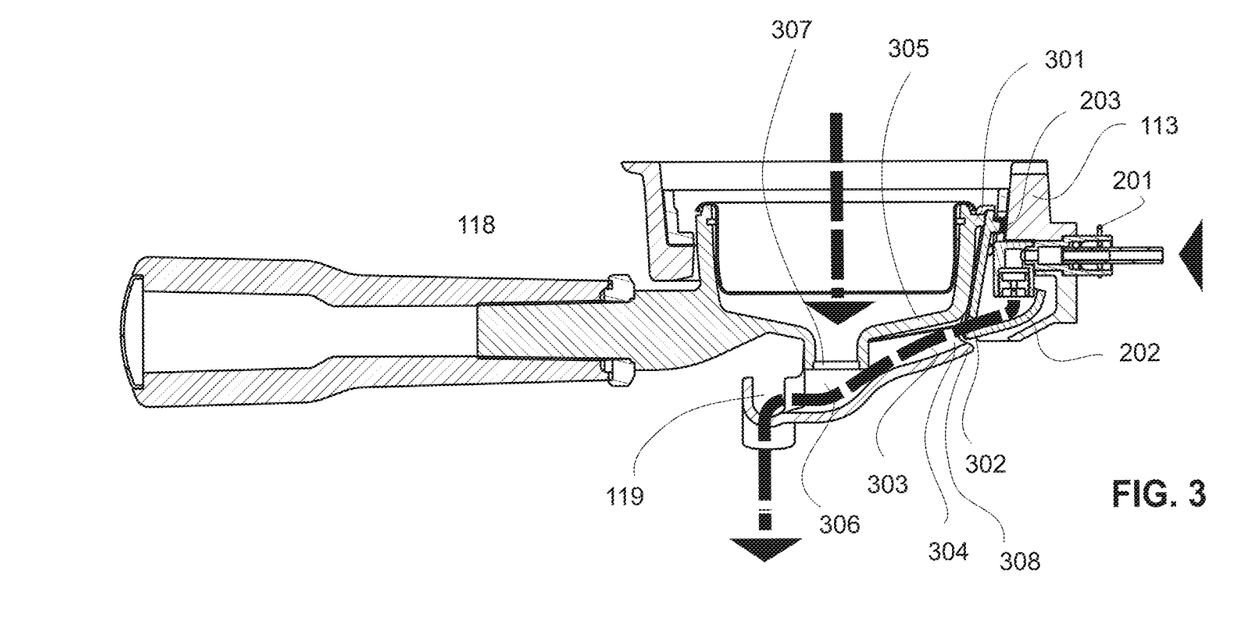
FIG. 3 is a cross sectional view of a portafilter, group head and pivoting spout illustrating the flow path for hot water through the portafilter.

As shown in FIG. 2, a group head 113 of an espresso machine is adapted to receive a portafilter 118. Conventionally, the portafilter has male bayonet features that cooperate with female bayonet features of the group head 113. The portafilter is installed by an insertion of the portafilter followed by a rotation that engages the cooperating bayonet features of the portafilter and group head. In this example, the hot water spout 117 comprises a fixed hot water discharge port 201, located on (for example) a forward facing surface of the machine 100, that dispenses into a pivoting nozzle 202. The rotating nozzle 202 may be fully or partially concealed within a shroud 204. The pivoting nozzle 202 is biased into a retracted orientation by a compression spring 203 that is interposed between the nozzle 202 and an interior surface of the group head 113. As shown in FIG. 2, as the portafilter 118 is first inserted into the group head 113, there is no interference between the portafilter and the pivoting spout 202. As shown in FIG. 3, rotation of the portafilter 118 as it is installed into the group head 113 brings one of the radially extending male bayonet features 301 of the portafilter into contact with an upper portion of the pivoting nozzle 202 this causes the spring 203 to compress thereby urging the generally horizontal facing discharge port 302 of the nozzle 202 to move toward the portafilter. In this example, the portafilter has a second flow path 303 that extends from a location 304 near the port 302 and below the head 305 of the portafilter, to a location 306 that is under the opening 307 through which a brewed coffee passes, through to the discharge spout 119 of the portafilter. Water flows freely under the influence of gravity from the fixed hot water discharge nozzle 201 through to the discharge spout 119 of the portafilter. When the portafilter is rotated for removal from the group head, the male bayonet feature 301 ceases to contact the pivoting nozzle 202 and under the influence of the spring 203, the pivoting nozzle returns to the position depicted in FIG. 2. This allows the portafilter to be withdrawn without interfering with the nozzle 202. In this embodiment, and as shown in FIG. 3, it is preferred that the terminal end of the discharge port 302 overhang the entry opening 308 into the second flow path 303. This eliminates dripping from the nozzle and eliminates the need for close tolerances or seals in the interconnection between the nozzle 202 and the flow path 303. Note that the auxiliary hot water enters the portafilter above the spout 119 and is discharged through the spout 119.

Figure 4:
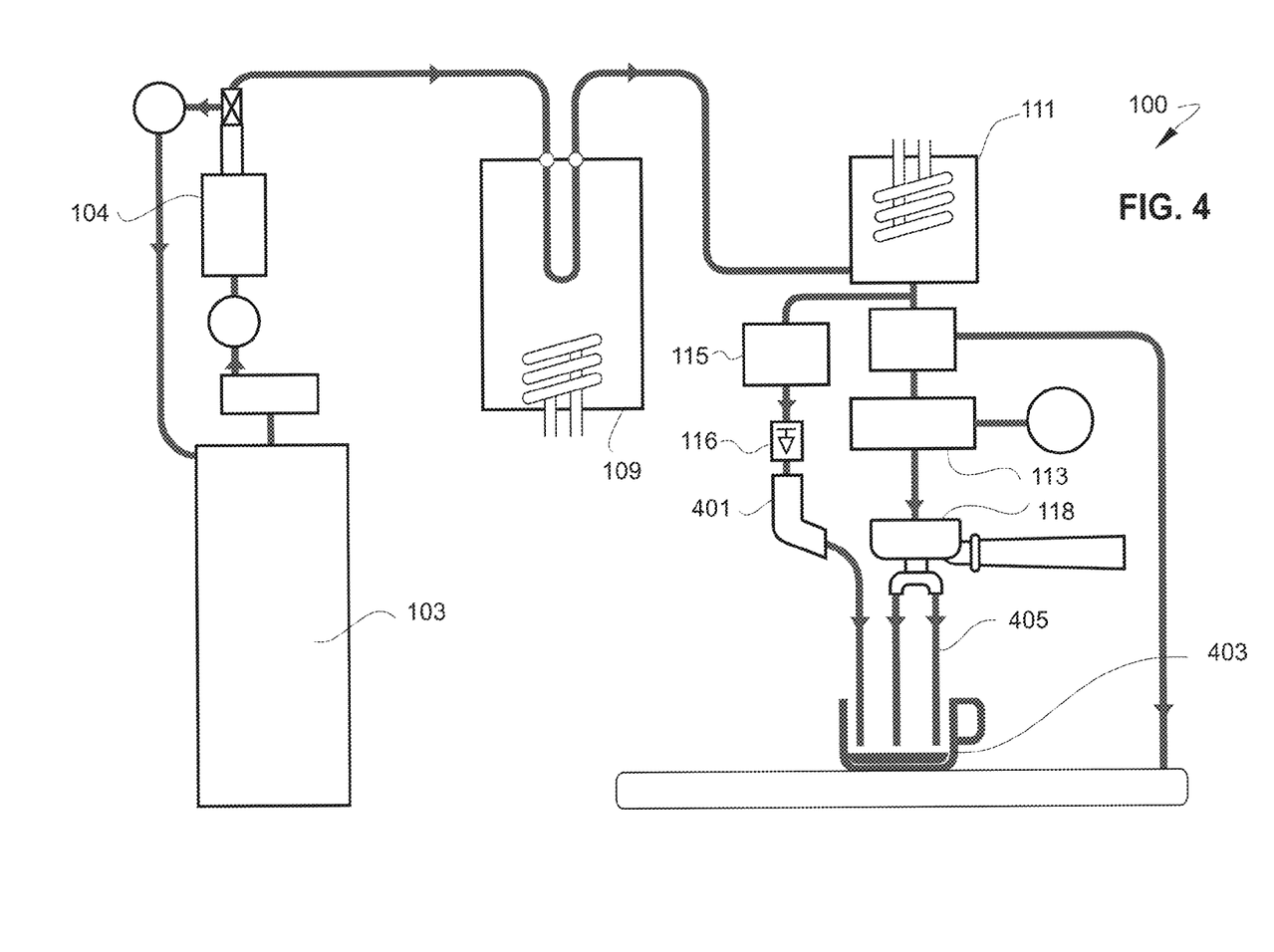
FIG. 4 is a schematic diagram of a second embodiment of an espresso machine having a cafe Americano feature.

A second embodiment of the technology is depicted in FIG. 4. In this embodiment, the auxiliary hot water discharge from the solenoid valve 115 passes through a antidrip check valve 116 and then through a fixed hot water discharge spout 401 located, for example, centrally on a front surface of the espresso machine 100, close to and beneath the group head 113. In this way, hot water is discharged into user's drinking vessel 403 without passing through the grounds or the portafilter 118. Like the aforementioned example, the espresso machine's microprocessor controller can cause the discharge of hot water from the spout 401 either before or after the extracted espresso 405 is discharged into the drinking vessel 403. In preferred embodiments the hot water is discharged from the nozzle 401 after the completion of the extraction and dispensing of the espresso coffee 405.

Figure 5:
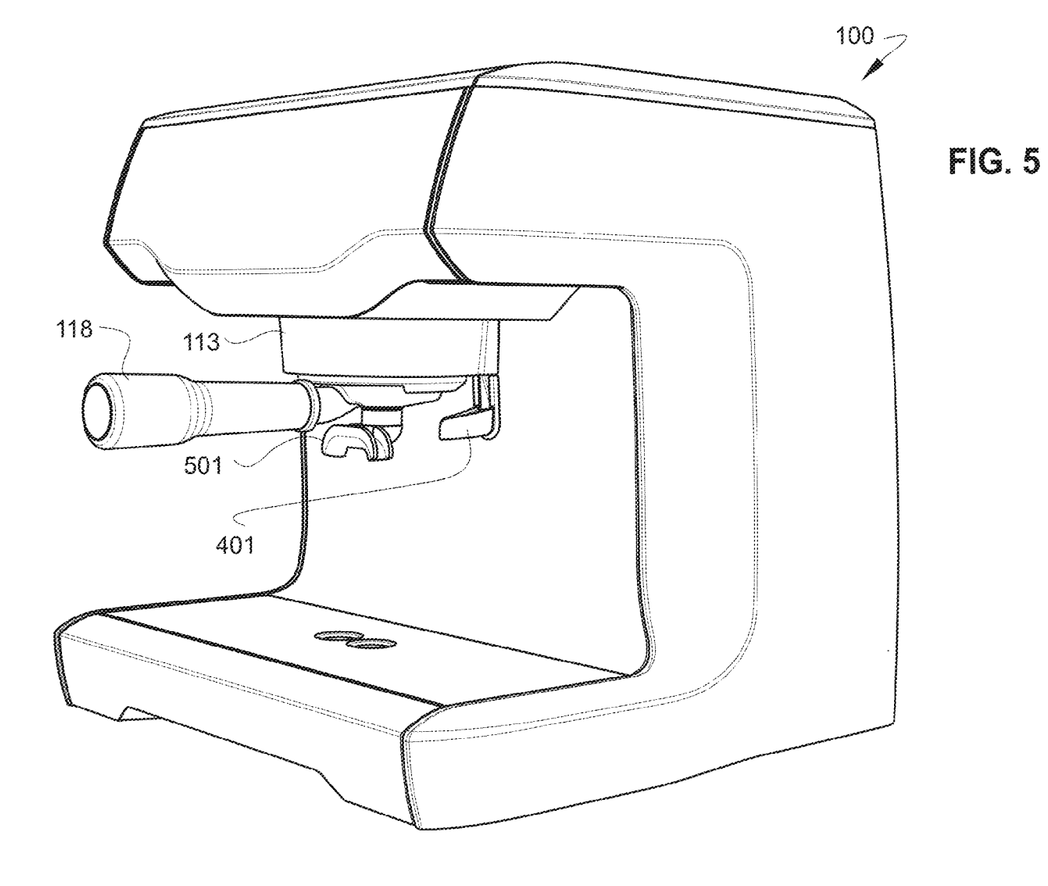
FIG. 5 is a perspective view of an espresso machine having a fixed hot water spout for making cafe Americano.

As shown in FIG. 5 the auxiliary hot water discharge spout 401 is located adjacent to or dispensing near the lateral mid-line of the group head 113. This allows the output of the portafilter 118 and the spout 401 to be discharged sequentially into the same drinking vessel 403 without moving the vessel once it is located under the spout 501 of the portafilter 118.

Figure 6:
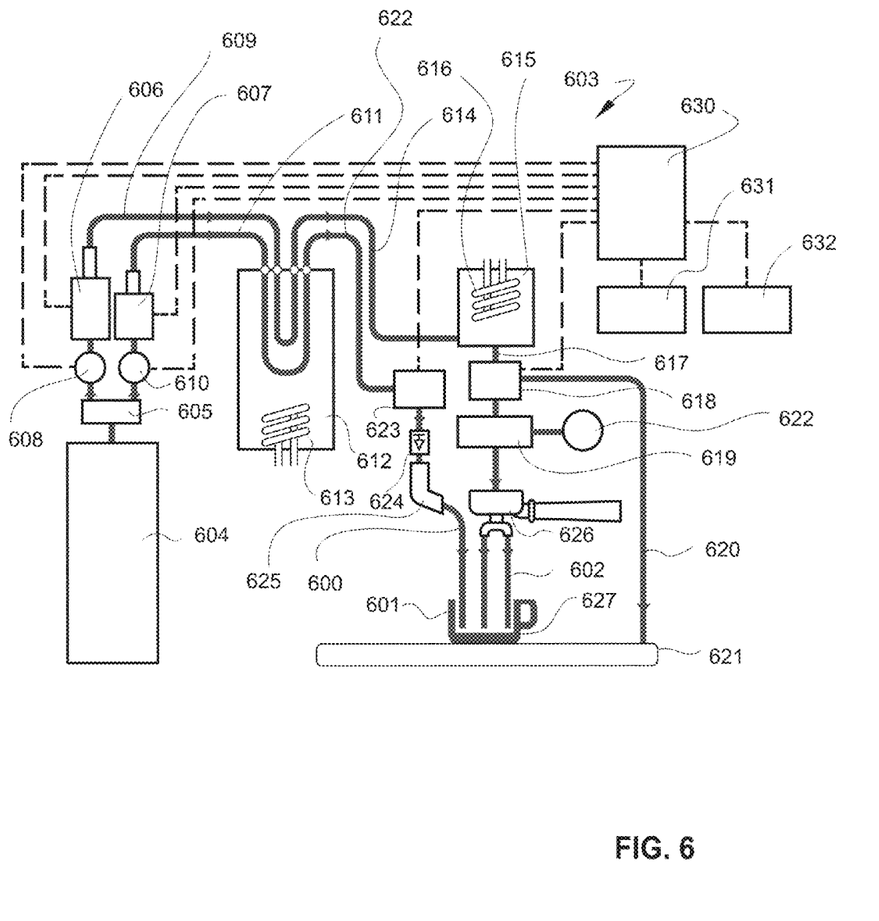
FIG. 6 is a schematic diagram of a coffee machine incorporating an auxiliary hot water delivery system.

As shown in FIG. 6, the delivery of the auxiliary hot water 600 into the final beverage 601 can occur simultaneously with the discharge of brewed coffee 602 rather than sequentially, as previously disclosed. Thus, a coffee making machine 603 has a water tank 604 that provides a supply of water through an optional filter 605 to both a high pressure pump 606 and (for example) a lower pressure pump 607. The higher pressure pump 606 is associated with a first flow meter 608 and provides a flow of water 609 at about 15 bar. The lower pressure water pump 607 is associated with a second flow meter 610 and provides a second and independent flow of hot water 611 at a lower pressure, e.g. about 3 bar. The outputs of each of the pumps 606, 607 optionally pass through a steam boiler 612 having a heating element 613. The high pressure flow exiting the steam boiler 614 passes through a second boiler 615 in which is located a second heating element 616. Water exiting the steam boiler 617 passes through a three-way, three-position solenoid valve 618. The solenoid valve discharges either into the group head 619 or may be discharged 620 into a drip tray 621 or other collection device. The water pressure in the group head may be monitored with a pressure gauge 621.

The lower pressure discharge 622 from the first or steam boiler 612 flows through a two-way, two-position solenoid valve 623 before passing through a drip preventing one-way valve 624. The discharge from the optional one-way valve 624 enters a dispensing spout 625 that is located adjacent to the portafilter 626. In this way, the discharge from both the spout 625 and portafilter 626 can be delivered simultaneously into a drinking vessel such as a coffee cup 627 that is located above the drip tray 621.

The process disclosed with reference to FIG. 6 is controlled by a processor 630. The processor receives inputs from a user interface 631 and drives a graphic display 632. The processor 630 receives information from both of the flow meters 608, 610 and controls the operation of the pumps 606, 607, the auxiliary hot water supply solenoid 623 and the brew solenoid 618 as well as other components of the device as required.

As disclosed with reference to, for example, FIG. 6, the processor 630 communicates with a user interface 631 and a graphic display 632. Various methods of operating the device, by user manipulation of the controls on the interface 631 and the resulting display information are disclosed with reference to FIGS. 7-13.

Figure 7:
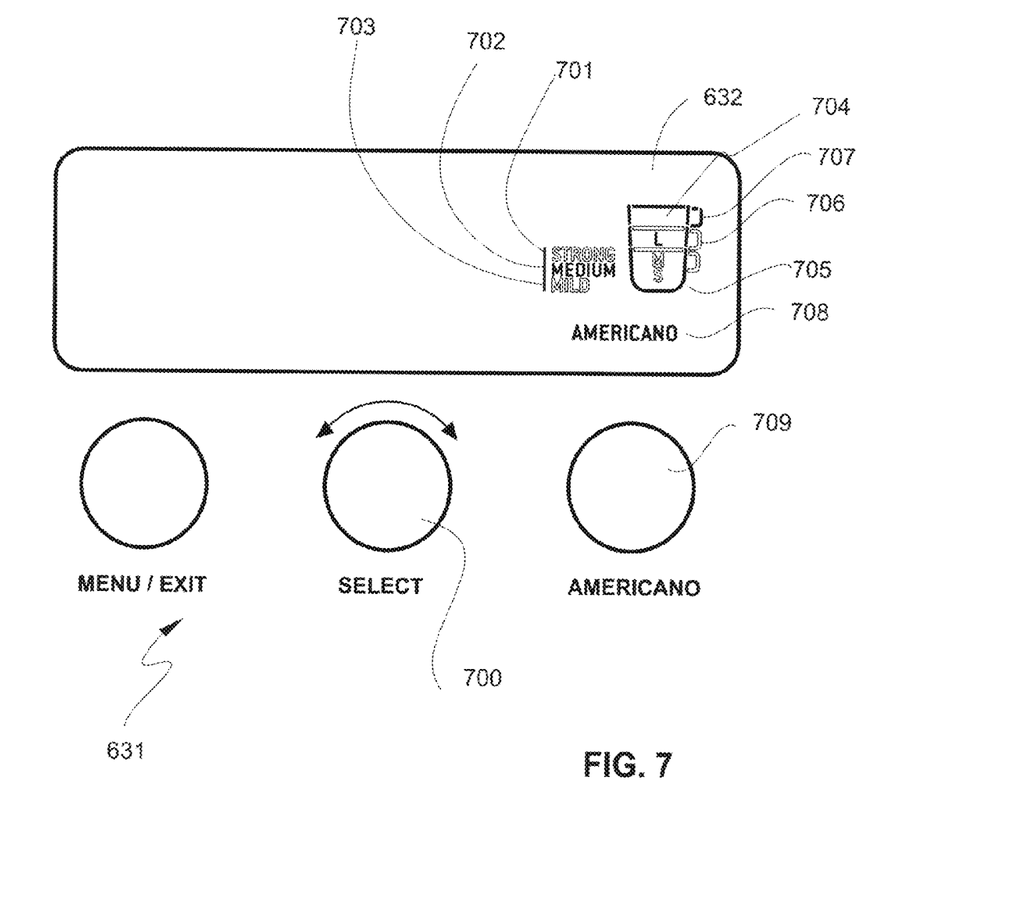
FIG. 7 is a schematic view of a user interface.

With reference to FIG. 7, the processor may be preprogrammed to offer a user pre-programmed settings regarding beverage strength and size. It will be appreciated that the processor will act to control the device to provide both brewed coffee dosage and a quantity of hot water from the auxiliary water supply system to correspond with the user selections. In the example of FIG. 7, the user interface includes a user operable control, for example a rotating knob 700 (with optional push button functionality) to allow a user to express preferences regarding the strength and size of the beverage made by the machine. In this example, the rotation of the selection control 700 results in a coordinated sequence of displays on the graphic interface, each one corresponding to a particular beverage size and strength and each one corresponding to a particular set of instructions executed by the processor. In this example, the graphic interface includes three beverage strength selections 701, 702, 703, corresponding to strong coffee 701, medium strength coffee 702 and mild strength coffee 703. The display also includes, in this example, symbolic representation of a beverage cup 704 whose appearance changes to indicate a delivery volume corresponding to a small size beverage 705, a medium size beverage 706 or a large size beverage 707. In response to rotation of the selection knob 700, the display 632 steps through, in sequence, individual selections for example strong beverage-small size, strong beverage-medium size, small beverage-large size, medium beverage-small size, medium beverage-medium size, medium beverage-large size, mild beverage-small size, mild beverage-medium size and mild beverage-large size. The graphic display also indicates a text or other graphic indication that an Americano type beverage had been user selected 708 with the appropriate Americano type beverage user selector or control 709.

Figure 8:
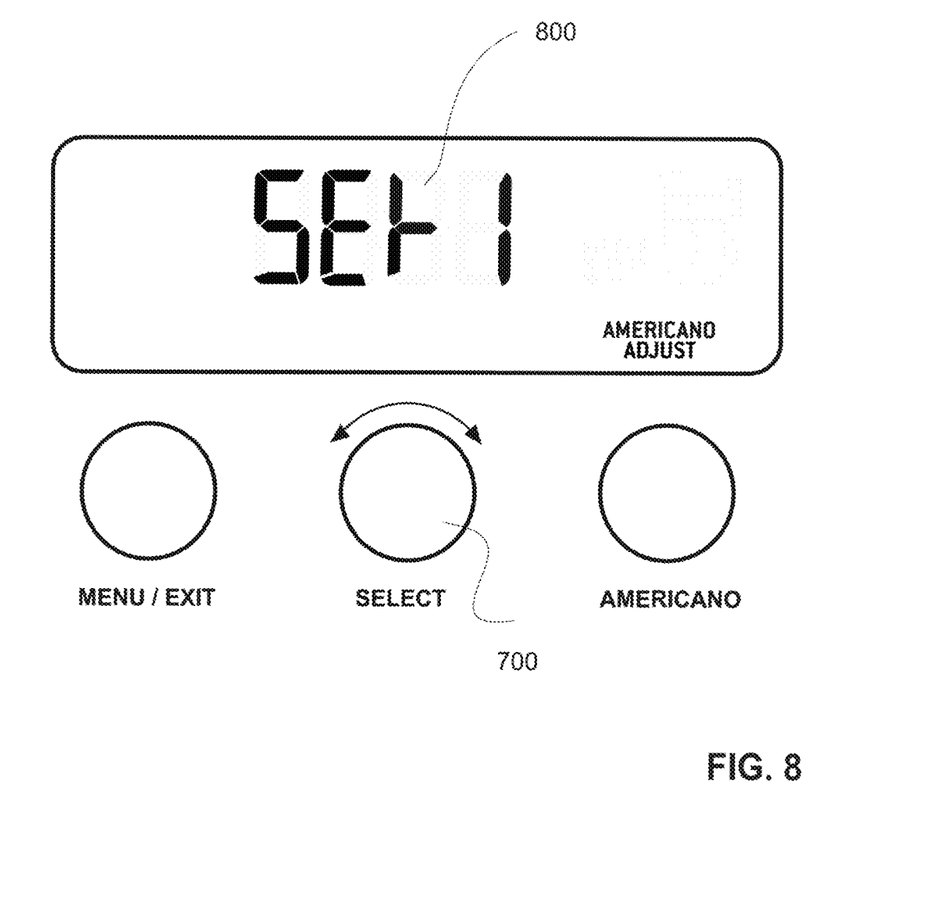
FIG. 8 is a schematic view of a user interface.

Further rotation of the selection knob 700 may cause the display to indicate and the processor to respond to a user selection of, for example, six different pre-set or user-programmed Americano style coffee settings, nominally referred to as settings 1 through 6. As shown in FIG. 8, a graphical text message SEt 1 800 appears on the display. This setting "SEt 1" corresponds to a previously programmed user selection involving user inputs relating to beverage size and strength, as will be explained. Thus, in the example of FIGS. 7 and 8, stepwise rotation of the selection control 700 results in the ability for the user to select 15 different beverage types (a pre-set and 6 user programmed) and for the processor to execute 15 different sets of instructions relating to the aforementioned user preferences or selections.

Figure 9:
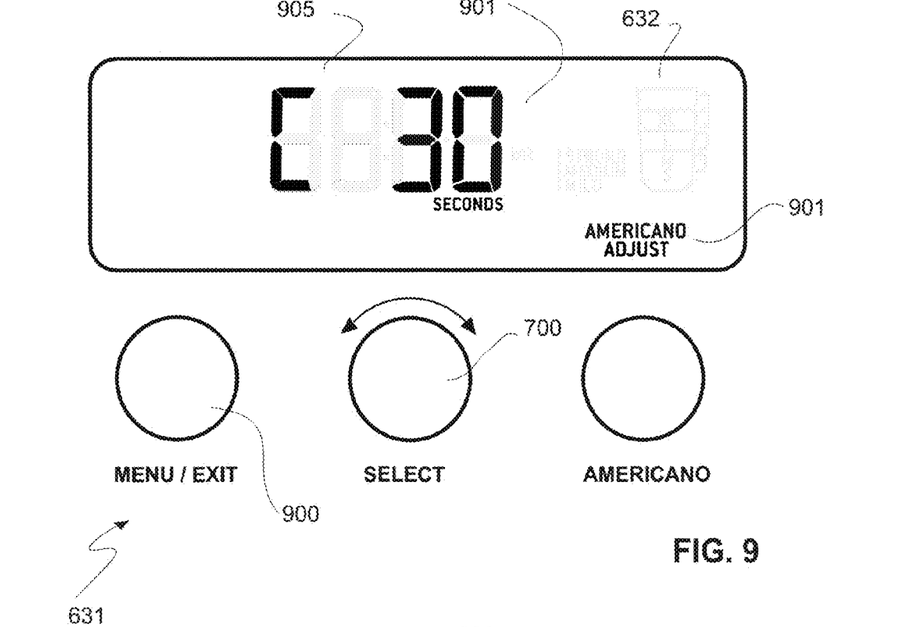
FIG. 9 is a schematic view of a user interface.

The user programmable settings, referred to above as SEt 1 through SEt 6 are accomplished, for example, and as shown in FIG. 9, by first a user activation of the MENU/EXIT control or button 900. This causes the display to provide an indication that a programming function has been activated, in this example, the words "AMERICANO ADJUST" 901 are displayed. In some examples, the programming function is only accessed when the user follows the first input on the MENU/EXIT button 900 with a depression of the selection control 700. Further rotation of the selection control causes the display to indicate, for example, a time 901, in this example 30 seconds, comprising the time duration of the discharge of the brewed coffee through the portafilter. The user uses the rotation of the selection control 700 to alter the processor controlled discharge duration for the brewed coffee as well as the graphic display of it 901.

Figure 10:
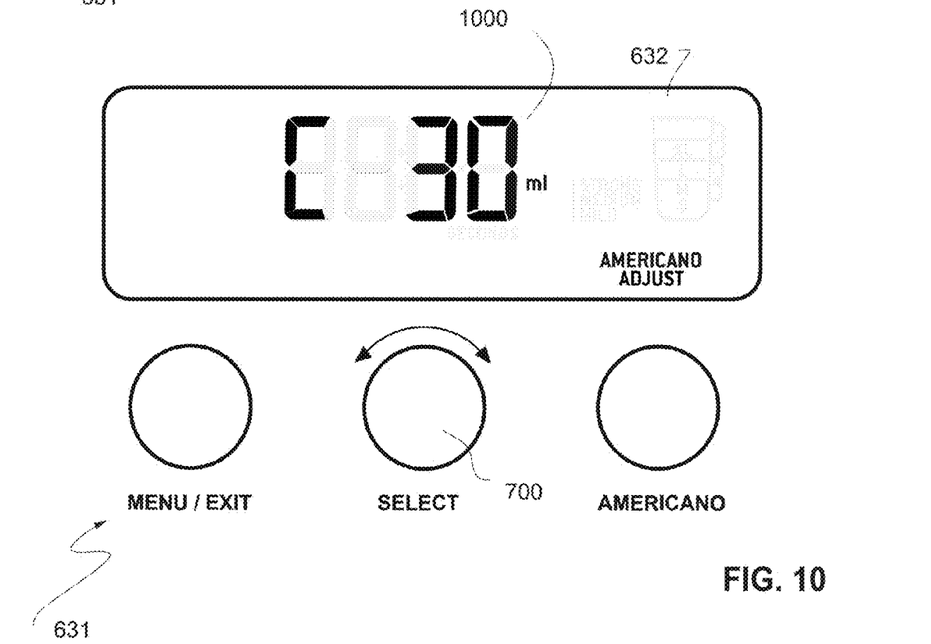
FIG. 10 is a schematic view of a user interface.

In the alternative, and as shown in FIG. 10, the aforementioned method of adjusting the discharge volume can be done in conjunction with signal indications from the flow meters. In this way, the user can select and the display 623 can indicate the brewed coffee discharge volume directly in a volumetric measurement, in this example 30 ml 1000.

Figure 11:
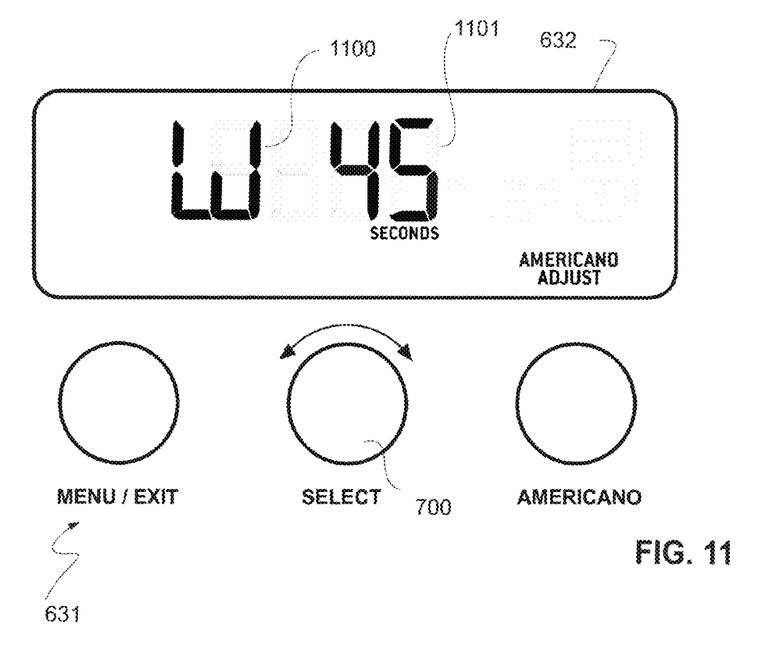
FIG. 11 is a schematic view of a user interface.
Figure 12:
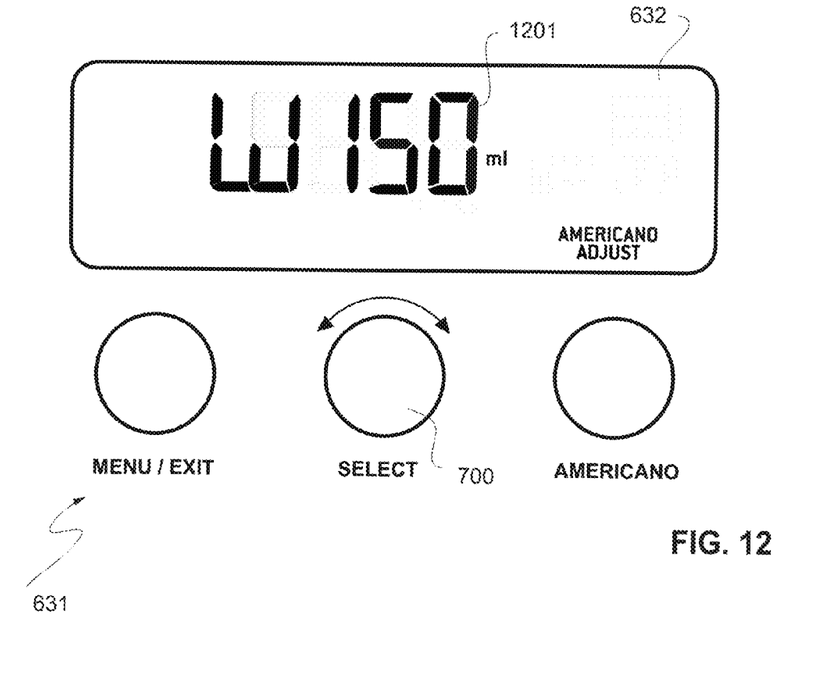
FIG. 12 is a schematic view of a user interface.

In the aforementioned examples of FIGS. 9 and 10, the display also provides an optional indication 905, being the letter "C", indicating that the brewed coffee discharge is being adjusted in either time or volume. Further depressing the selector control 700 causes the display to change so as to provide a graphic indication that the auxiliary water volume is being adjusted, in this example, with a display of the letter "W" 1100. With reference to FIGS. 11 and 12, the display 632 can indicate the user selection either in auxiliary hot water discharge time 1101 or volume 1201.

Figure 13:
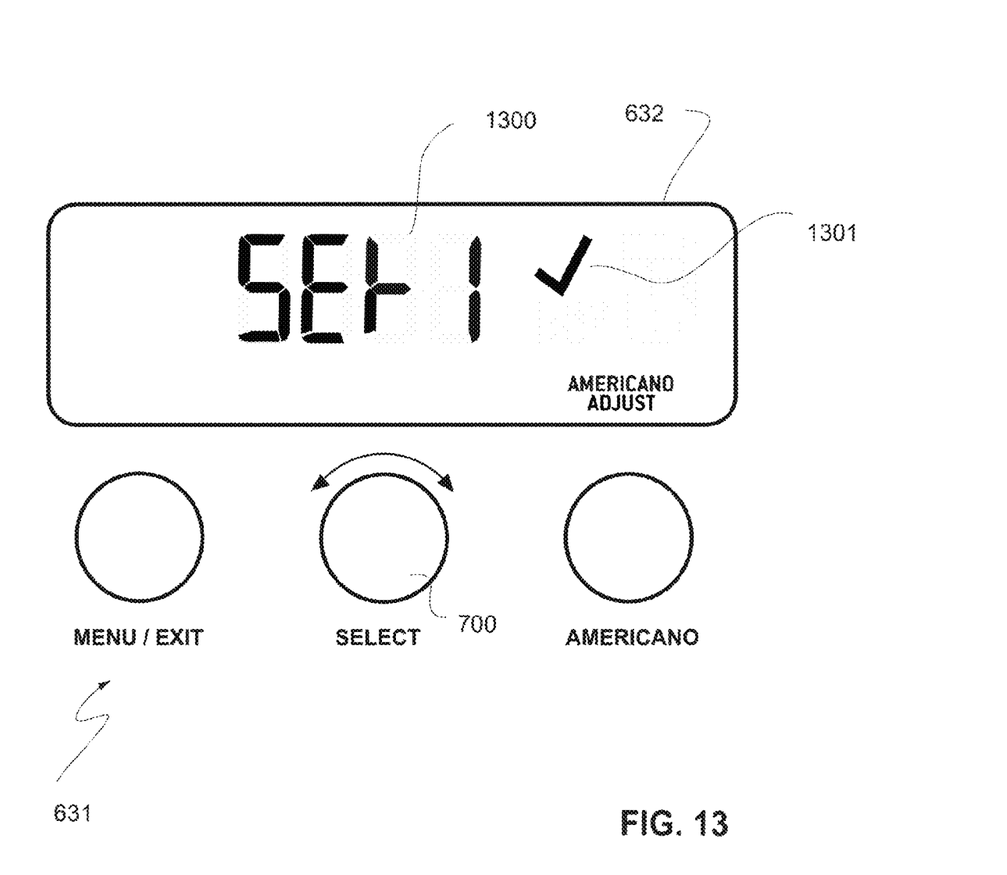
FIG. 13 is a schematic view of a user interface.

As shown in FIG. 13, once the user preference or beverage parameters with relation to brewed coffee volume and auxiliary water volume have been made, a further depressing of the selector control 700 causes the display to show the user-programmed setting number 1300 and, for example, a graphic indication 1301 or sonic alert, that the aforementioned preferences and parameters have been stored by the microprocessor for later use. Accessing the pre-programmed settings has been explained with reference to FIG. 8.

Although the invention has been described with reference to specific examples, it will be appreciated by those skilled in the art that the invention may be embodied in many other forms.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Any claims following the Detailed Description are hereby expressly incorporated into this Detailed Description, with each claim standing on its own as a separate embodiment of this invention.

Unless specifically stated otherwise, as apparent from the following discussions, it is appreciated that throughout the specification discussions utilizing terms such as "processing," "computing," "calculating," "determining" or the like, refer to the action and/or processes of a microprocessor, controller computer or computing system, or similar electronic computing device, that manipulates and/or transforms data.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention.

The claims defining the invention are as follows:

1. An espresso making device, the device comprising:

a user interface that comprises controls for providing user preferences regarding both a volume size and a strength of a beverage discharged as a coffee dose;

a removable portafilter, the portafilter having a compartment for coffee grounds and a discharge spout; the compartment having an opening for discharging brewed coffee to the spout;

a group head for engaging the portafilter;

an auxiliary port located adjacent to the group head for discharging hot water;

the portafilter defining a secondary flow path that is separate from the compartment and extending from a location near to an auxiliary port when the portafilter is fitted to the group head, to a discharge spout; so as to discharge hot water into the drinking vessel when the vessel is located under the spout;

wherein the secondary flow path has a receiving aperture, in flow communication with the auxiliary port, that is external to the engaged group head and portafilter; such that hot water is selectively discharged into the drinking vessel without passing through the engagement between the group head and the portafilter.

2. The device of claim 1, wherein:

the spout is in fluid flow communication with both the compartment and the secondary flow path to simultaneously deliver a mix of the brewed coffee and the additional hot water.

3. The device of claim 1, wherein:

discharge of the brewed coffee and the additional hot water is controlled by a processor in accordance with the user preferences.

4. The device of claim 3, wherein:

flows are controlled by processor controlled valves in accordance with durations of the discharges determined by the processor.

5. The device of claim 4, wherein:

the brewed coffee discharged is measured by a first flow meter and the additional hot water discharged by the auxiliary port is measured by a second flow meter;

both flow meters providing flow information to the processor from which information the processor independently controls the durations of the discharges.

6. The device of claim 3, wherein:

the brewed coffee discharged and the additional hot water are measured by a pair of flow meters;

the pair of flow meters providing flow information to the processor from which information the processor controls the durations.

* * * * *